Feb. 17, 1970      W. J. CLEMENS      3,495,411

WATER LEVEL CONTROL SYSTEM

Filed June 28, 1968

INVENTOR
WILLIAM J. CLEMENS

BY

ATTORNEYS

United States Patent Office 3,495,411
Patented Feb. 17, 1970

3,495,411
WATER LEVEL CONTROL SYSTEM
William J. Clemens, Mountain View, Calif., assignor to the United States of America as represented by the Secretary of the Interior
Filed June 28, 1968, Ser. No. 776,287
Int. Cl. E02b 7/20, 7/40
U.S. Cl. 61—23
5 Claims

ABSTRACT OF THE DISCLOSURE

Water level behind a dam or other water control structure is maintained at a substantially constant level by controlling the by-pass or spillway gate responsive to both water level and direction of water level movement.

This invention resulted from work done by the Bureau of Reclamation of the Department of the Interior, and the domestic title to the invention is in the Government.

BACKGROUND OF THE INVENTION

Automatically controlled gates have long been used to control water levels behind dams and other water control structures. One control device used to regulate such gates consists of a float which senses changes in the water level of the canal or reservoir on which it is installed. A steel tape or wire attached to the float passes over a pulley and has a counterweight attached to its other end to keep it taut. Typically the pulley is mounted on a shaft to which two cams are attached. A limit switch is mounted above each cam so that when the water level rises above or falls below the control limits, one or the other of the switches is tripped or turned on.

Switches may directly control a motor which acts to raise and lower the gate but usually the switch controls a timer which in turn controls the gate motor. In those installations where a timer is used, the limit switch activates the timer which turns the gate motor on for a few seconds and then stops it. The timer is set for a short delay period, usually on the order of 1 to 5 minutes. If the limit switch is still on at the end of the delay period, the gate motor is again turned on for a few seconds. This cycle is repeated until the water level is back within the preset control limits and the limit switch is turned off. Depending upon which limit switch is activated, the timer causes the gate motor to either raise or lower the gate. The average speed of the gate movement is adjusted by varying the delay period of the timer.

A major problem with this type of control system is its instability and its tendency to hunt. As the water level rises above the control limit for example, the gate is progressively opened wider and wider. At some point, the flow of water through the gate is increased sufficiently to start dropping the water level. In spite of the fact that water level is now decreasing, the gate continues to open wider until the water level drops within the control limits. At this time the gate, responding to the lowered water level, begins to close. Typically, the water level drops below the control limits and a regular oscillation of the water level takes place.

Increasing the delay period of the timer tends to damp the oscillation or hunting but introduces the danger that the gate will not open fast enough if the flow of water upstream of the gate is increased significantly. In many instances, there are a number of level control gates placed in series such as in the case of check dams on an irrigation canal. In these situations, when one gate starts to hunt it causes those downstream to hunt also, usually at progressively larger amplitudes. With a large number of gates in series, the water level fluctuations at the last gate can become dangerously large. The advantages of a system to introduce stability into the control of water levels then is readily apparent.

This invention provides a stable system for the control of water levels. In the system, absolute water level is detected in a conventional fashion using cam-activated switches. In addition, gate opening is restricted to those times when the direction of water level is above preset limits and is also rising while gate closing is restricted to those times where water level is below preset limits and is also falling. By controlling on this basis, hunting of the gate control is virtually eliminated.

Thus, it is an object of this invention to provide an improved system for the control of water level.

It is a further object of this invention to provide means to monitor and control the level of a body of water responsive to both water level and direction of water level movement.

DETAILED DESCRIPTION OF THE INVENTION

The invention will be more clearly understood from the following description of a preferred embodiment wherein reference is made to the accompanying drawings.

Figure 1:
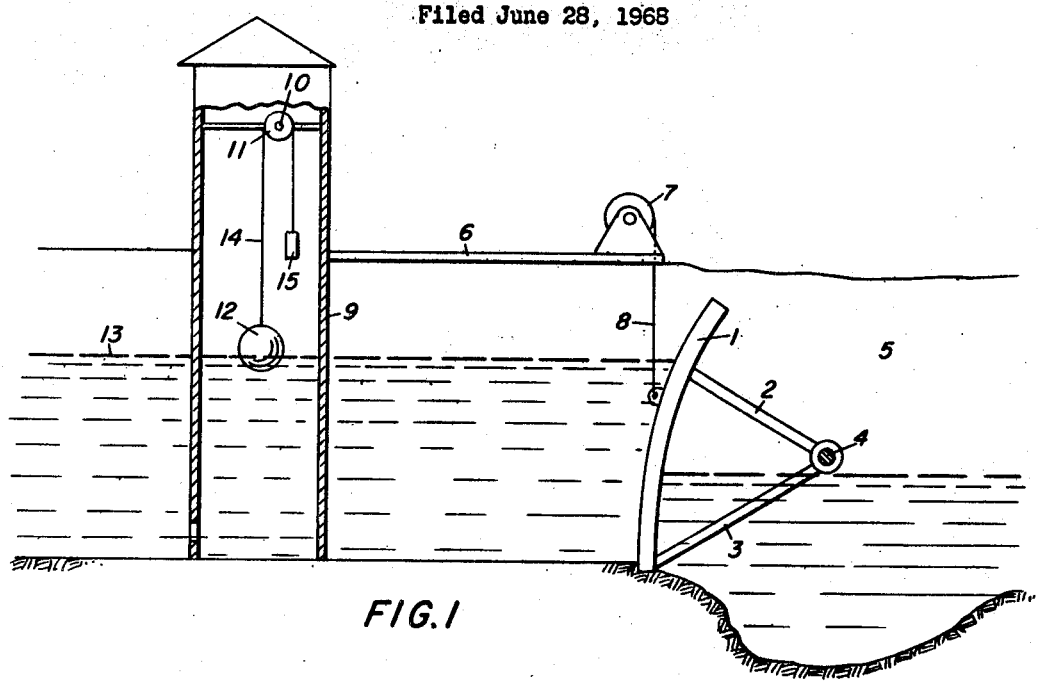
FIG. 1 is a partial sectional view of a dam and gate showing a typical arrangement of the control device relative to the dam and gate.

Referring now to FIG. 1, radial gate 1 is mounted on arms 2 and 3 for pivotal movement around trunnion pin 4. Pin 4 is fixed in an abutment of the dam structure 5. The dam structure is provided with a platform 6 on which is mounted gate control motor and winch assembly 7. Winch assembly 7 is connected to the gate by means elevating cable 8.

Located somewhat upstream from the gate is float well 9. Mounted within the float well is the water level control device. This device comprises a generally horizontal shaft 10 on which is mounted pulley 11. A buoyant float 12 is supported on water surface 13 and a flexible tension member or cable 14 is connected to the float and extends upwardly over the pulley. Counterweight 15 is attached to the opposite end of cable 14 and acts to maintain the cable in a taut condition. As the water level changes, float 12 moves up and down thus imparting a rotary motion to pulley 11. This general structure is well known and will not be described in greater detail.

Figure 2:
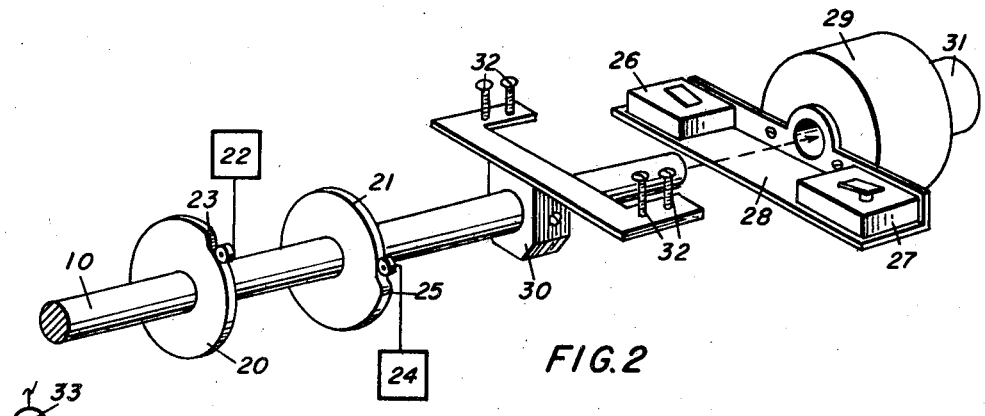
FIG. 2 is a perspective, partially-exploded view of a portion of the control system.

Turning now to FIG. 2, there is shown a perspective partially exploded view of a portion of the control system located in the float well of FIG. 1.

Shaft 10 has mounted thereon cams 20 and 21. The forward end of shaft 10 is connected to pulley 11 (not shown) with its associated float and counterweight assembly. Cams 20 and 21 are fixed to the shaft and rotate in a clockwise direction, as viewed in FIGS. 1 and 2, when the water level rises. Thus, cam 20 controls gate opening while cam 21 controls gate closing. Associated with cam 20 is gate opening switch 22 which is activated by cam lobe 23 upon clockwise rotation of the shaft. Likewise, gate closing switch 24 is activated by lobe 25 of cam 21 upon counterclockwise rotation of shaft 10 produced by a lowered water level.

Two additional microswitches, 26 and 27, are mounted on rotatable bracket 28 which has as its axis of rotation shaft 10. Thus, switches 26 and 27 are rotatable in a circular path concentric with shaft 10. Bracket 28 is attached to frictional clutch assembly 29. This clucth can comprise any conventional controlled friction device but preferably comprises an adjustably loaded ball bearing assembly. Also fixably mounted on shaft 10 is switch actautor arm 30. In assembled position, shaft 10 extends through clutch assembly 29 and is seated in bearing 31.

As shaft 10 rotates, actuator arm 30 activates either switch 26 or 27 depending upon the direction of rotation. Amount of shaft free travel before switch activation is controlled by adjustment screws 32. After activating the switch, actuator arm 30 pushes the switch and bracket 28 around with it. Load or drag on clutch assembly 29 is maintained great enough to actuate switches 26 or 27 without movement of bracket 28 but is small enough that undue force is not required to rotate the bracket and switch assembly after switch activation.

In operation, as water level rises, shaft 10 rotates in a clockwise direction. Switch 22 is activated by cam 20 and switch 27 is activated by rotation of bracket 28. As long as the water level continues to rise, both switches remain activated. However, as soon as the water level changes direction and starts to fall, bracket 28 disengages switch 27 and activates switch 26. Switch 22 remains in an activated position until the water level falls back within the preset control limits.

Figure 3:
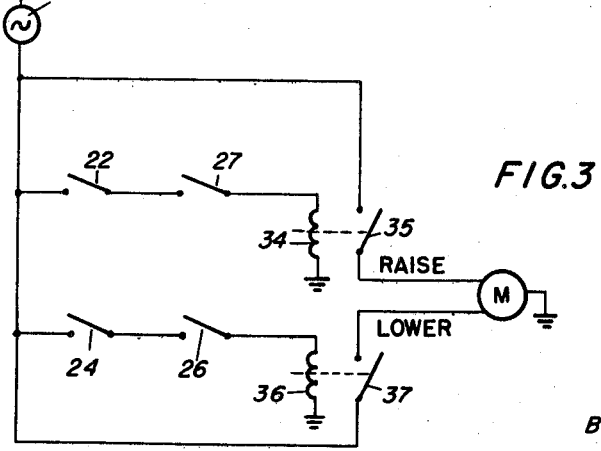
FIG. 3 illustrates a schematic wiring diagram of the control system.

A schematic wiring diagram of the control system is shown in FIG. 3. Switches 22 and 27 are connected in series with any suitable electric power source 33. When both switches are in a closed position, relay coil 34 is energized thus urging its associated normally-open contact 35 to close. The closing of contact 35 allows line current to flow to motor 7 and thus raise the gate. Likewise, switches 24 and 26 are connected in series and when closed energize coil 36. This in turn urges contact 37 to close supplying current to motor 7. Motor 7 is so wired that current supplied via contact 37 causes it to rotate in a direction opposite to that when current is supplied via contact 35. If desired, a timer may be inserted in the line between the second switch and the coil, as between switch 27 and coil 34, so as to provide additional control over the averaged rate of gate opening or closing in the manner described earlier.

In order for the gate to raise, two conditions must be present. First, the water level must be above a preset control limit. This condition is monitored by switch 22. Secondly, the water level must either be rising or at its stationary peak level. This condition is sensed by switch 27. As soon as water level starts to fall, even though it remains above the present control limit, the gate will not open further because switch 27 is now in an open position. An analogous situation exists with switches 24 and 26 at water levels below the control limits.

As may be readily appreciated, the invention provides an extremely simple and dependable system for water level control. By monitoring and controlling gate position on the basis of two variables; absolute water level and change in water level, hunting is reduced to a minimum. Consequently, water flow and level downstream of the control structure is much more uniform.

What is claimed is:

1. A control system adapted to maintain a predetermined and substantially constant water level behind a water control structure which comprises:
   (a) a reversibly operating gate adapted to interrupt and control water flow in a channel by-passing said structure;
   (b) detecting means responding to the level and fluctuation of water behind said structure;
   (c) first sensing means operably connected to said detecting means and adapted to monitor absolute water level, said sensing means producing a first electrical signal responsive to absolute water level above a preset limit and producing a second electrical signal responsive to absolute water level below a preset limit;
   (d) second sensing means operably connected to said detecting means and adapted to monitor direction of water level movement, said second sensing means producing a first electrical signal responsive to upward movement of said water level and producing a second electrical signal responsive to downward movement of said water level; and
   (e) actuator means for opening and closing said gate, said actuator means operatively connected to said first and second sensing means and responding to a combined signal from said first and second sensing means, said combined signal causing the actuator to raise the gate when said sensing means indicates a water level above the preset limit and said second sensing means indicates an upward movement of said water level and causing the actuator to close the gate when said first sensing means indicates a water level below the preset limit and said second sensing means indicates a falling water level.

2. The system of claim 1 wherein said detecting means comprises float means resting on said body of water, said float means operably connected to a shaft and producing rotary movement of said shaft responsive to changes in the level of said body of water.

3. The system of claim 2 wherein said first sensing means comprises cam means mounted on said shaft and rotatable therewith, a first switch engageable by the cam means to produce a first electrical signal when said water level rises above a preset limit and a second switch engageable by the cam means to produce a second electrical signal when said water level falls below a preset limit.

4. The system of claim 3 wherein said second sensing means comprises an actuator arm mounted on said shaft and rotatable therewith, bracket means concentrically rotatable about said shaft, a first and a second switch mounted on said bracket means and rotatable therewith, and frictional means adapted to retard the rotation of said bracket means, said first switch engageable by said actuator arm when said shaft rotates responsive to a rising water level and said second switch engageable by said actuator arm when said shaft rotates responsive to a falling water level, said actuator arm rotating said bracket after engagement of either of said first and second switches.

5. The system of claim 4 wherein said first switch of said first sensing means is wired in series with said first switch of said second sensing means, and wherein said second switch of said first sensing means is wired in series with said second switch of said second sensing means.

References Cited

UNITED STATES PATENTS

| | | | |
|---|---|---|---|
| 1,738,051 | 12/1929 | Harker | 61—23 |
| 1,744,455 | 1/1930 | Duwe | 61—23 |
| 3,121,313 | 2/1964 | Moore | 61—23 |

PETER M. CAUN, Primary Examiner